Figure 1:
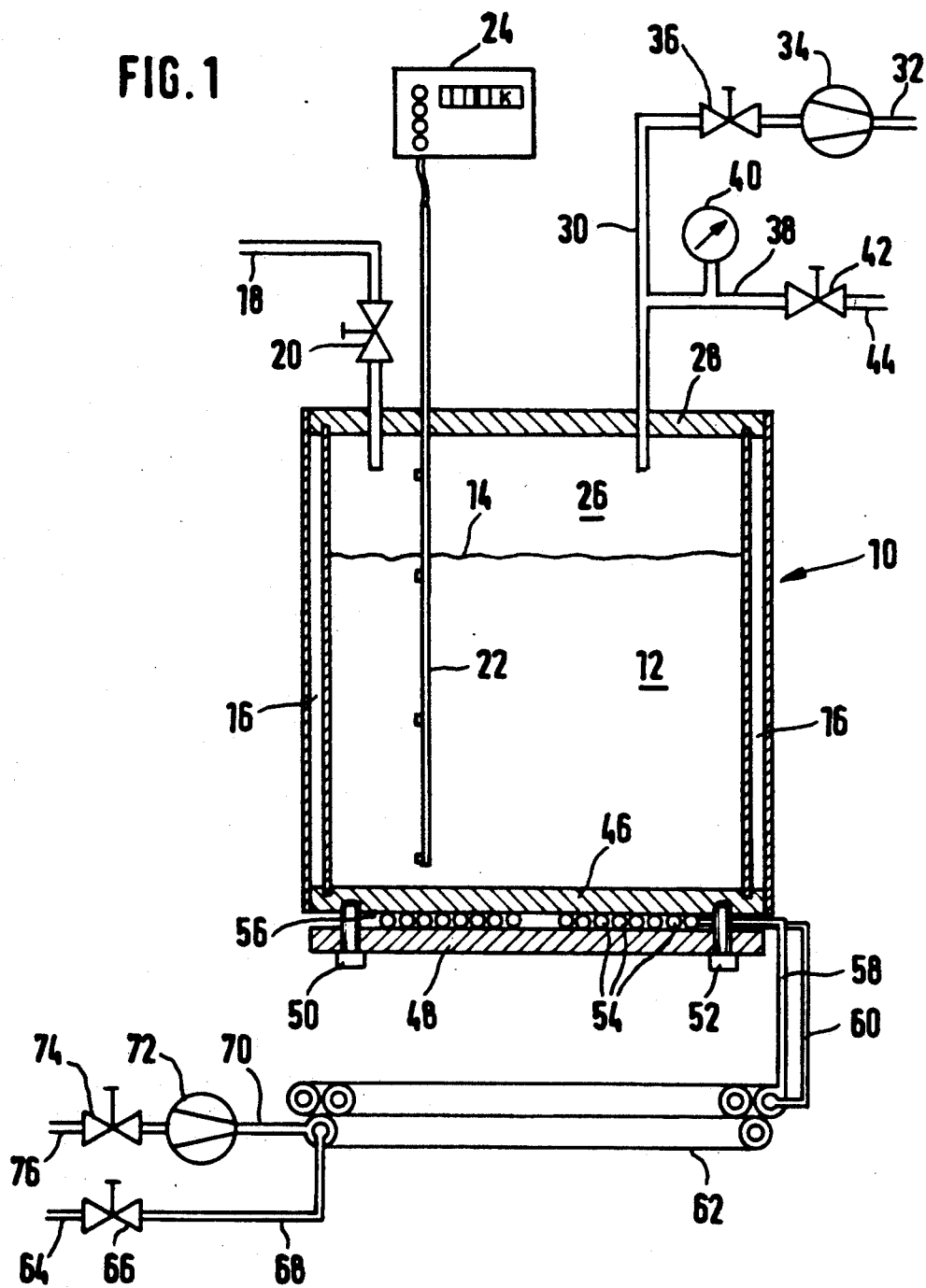

United States Patent [19]

Basting et al.

[11] Patent Number: 5,136,605
[45] Date of Patent: Aug. 4, 1992

[54] APPARATUS FOR PURIFYING LASER GAS

[75] Inventors: Dirk Basting, Göttingen; Gerd Steinführer, Bovenden; Frank Voss, Göttingen, all of Fed. Rep. of Germany

[73] Assignee: Lambda Physik Gesellschaft zur Herstellung von Lasern mbH, Gottingen, Fed. Rep. of Germany

[21] Appl. No.: 670,743

[22] Filed: Mar. 15, 1991

[30] Foreign Application Priority Data

Mar. 27, 1990 [DE] Fed. Rep. of Germany ....... 4009850

[51] Int. Cl.⁵ .............................................. H01S 3/22
[52] U.S. Cl. ...................................................... 372/59
[58] Field of Search .................................... 372/34, 59

[56] References Cited

U.S. PATENT DOCUMENTS

| 4,601,040 | 7/1986 | Andrews et al. | 372/34 |
| 4,674,092 | 6/1987 | Cannon | 372/34 |
| 4,803,693 | 2/1989 | Schramm | 372/59 |
| 4,977,749 | 12/1990 | Sercel | 372/59 |
| 5,014,281 | 5/1991 | Hecht et al. | 372/59 |

FOREIGN PATENT DOCUMENTS 3632995 4/1987 Fed. Rep. of Germany .

Primary Examiner—Léon Scott, Jr.
Attorney, Agent, or Firm—George P. Hoare, Jr.

[57] ABSTRACT

An apparatus for purifying laser gas, in particular for excimer and $F_2$ lasers, employs liquid nitrogen (12) for freezing impurities out of the laser gas, the freeze-out temperature being set by means of the pressure above the surface (14) of the liquid nitrogen (12).

8 Claims, 2 Drawing Sheets

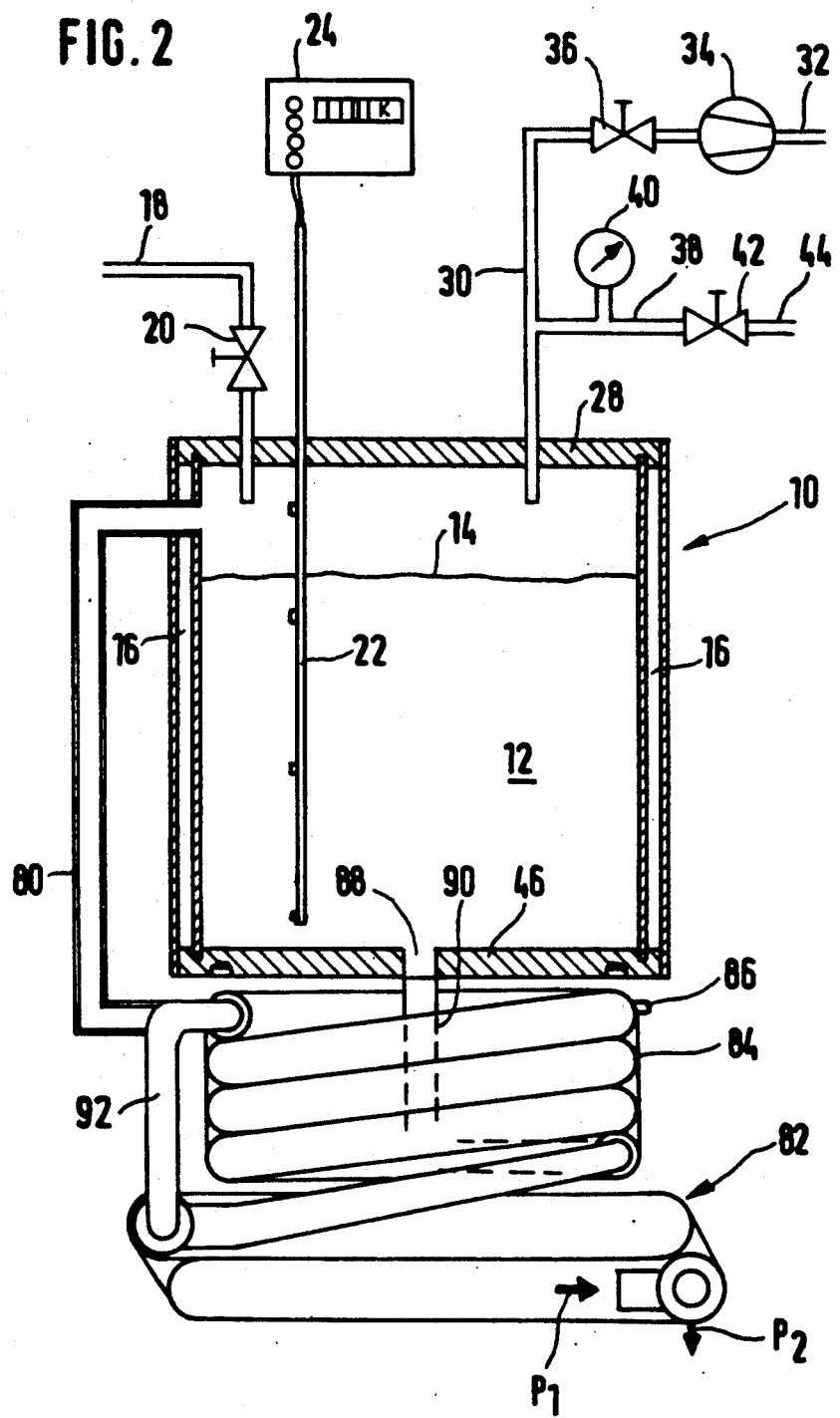

APPARATUS FOR PURIFYING LASER GAS

The invention relates to an apparatus for purifying laser gas, in particular for excimer and $F_2$ lasers, using liquid nitrogen to freeze impurities out of the laser gas, the freeze-out temperature being adjustable.

Pulsed gas lasers, such as excimer and $F_2$ lasers, are stimulated by gas discharges. The laser gas is contaminated by the gas discharges, in particular by burn-off at the gas discharge electrodes, chemical reactions and desorptions from the walls, in particular the windows of the laser. Such impurities and contaminations impair the efficiency and life of the laser. Also, as a rule the gas introduced is contaminated from the start.

It is known in the prior art to conduct the laser gas from the gas-discharge space to a purifying apparatus and then recirculate said gas to the gas-discharge space again. It is also known to carry out this gas purification by freezing out at temperatures of liquid nitrogen.

Low-temperature experiments have shown for example with $F_2$ lasers that a considerable increase of the laser power is possible if the operating temperature of the freeze-out range of the cryogenic gas purifier lies appreciably below 77 K (typical temperature of liquid nitrogen at atmospheric pressure).

Depending on the gas mixture used, gas-discharge lasers can emit at different wavelengths. As a rule, to obtain a laser emitting radiation of a different wavelength only the gas is replaced. If the gas discharge is not carried out with $F_2$ gas but noble gases such as Kr and Xe (apart from ArF) are added when operating as excimer laser, the purification of the laser gas by cryogenic freezing out should take place only at temperatures which are higher than 77 K.

The object of the invention is to provide an apparatus for purifying laser gas which in simple and economic manner permits freezing of impurities out of the laser gas at different temperatures below and above 77 K.

It would be conceivable to solve this problem in that in the freeze-out region of the apparatus a heating device is provided with which a certain temperature can be selectively set. However, such a solution does not permit any temperatures beneath 77 K and also has the disadvantage of resulting in an increased consumption of liquid nitrogen.

In contrast, the solution according to the invention provides that the freeze-out temperature is adjusted by means of the pressure above the liquid (possibly also solid) nitrogen.

In partial vacuum operation (partial vacuum with respect to the atmosphere) a temperature is achieved in the freeze-out region which is lower than 77 K whilst with excesspressure operation (with respect to the atmosphere) temperatures can be set in the freeze-out region which lie above 77 K.

Thus, without appreciable modifications the apparatus according to the invention permits the setting of desired temperatures for freezing impurities out of laser gas depending on the type of gas used. The temperature range which can be achieved with liquid nitrogen is widened to values lower than the temperature of liquid nitrogen at atmospheric pressure and consequently the laser efficiency can be increased for certain gases. No heating is necessary and the consumption of liquid nitrogen at temperatures above 77 K is relatively low.

Furthermore, one variant of the invention is also based on the knowledge that with in particular an $F_2$ laser (with the operating gases $F_2$ and He) the laser power can be appreciably increased with a fresh gas filling as well if the gas is cryogenically purified before the laser operation. The best results here are observed at a temperature of 63 K, a temperature at which condensation of $F_2$ just starts.

Hereinafter some examples of embodiment of the invention will be explained in detail with the aid of the drawings, wherein:

FIG. 1 shows a first example of embodiment of an apparatus for purifying laser gas and FIG. 2 a modified example of embodiment of an apparatus for purifying laser gas.

In the figures, corresponding components are provided with the same reference numerals.

Liquid nitrogen 12 is contained in a container 10. The surface of the liquid or solid phase of the nitrogen 12 is denoted by 14.

The container 10 is thermally insulated, this being done in the example of embodiment illustrated by evacuated spaces 16 in its walls. Instead of evacuation, insulating material may also be provided.

Via a conduit 18 and a valve 20 liquid nitrogen may be introduced into the container 10 for replenishment.

By means of a filling level measuring device 22 known per se the level of the liquid nitrogen 12 in the container 10 is determined, i.e. the position of the surface 14 of the liquid phase. The result is displayed at a measuring instrument 24. A temperature measuring device is also integrated into the level measuring device 22 and the measurement result thereof likewise displayed at the instrument 24.

The container 10 is sealed with respect to the outside. Above the surface 14 of the liquid (or possible solid) nitrogen 12 there is a gas phase 26 and the pressure in the gas phase may be different to the atmospheric pressure due to the sealed closure of the container 10 with respect to the outer atmosphere.

The container 10 is closed by a cover 28. Apart from the conduit 18 already mentioned and the level measuring device 22 a conduit 30 also passes through the cover 28 into the interior of the container 10. All the passages and conduits are led through the cover 28 in vacuum-tight manner resistant to excess pressure. The conduit 30 leads via a valve 36 to a vacuum pump 34 which on operation when the valve 36 is open conveys gases (essentially liquid nitrogen) from the free space above the surface 14 via a conduit 32 to the outer atmosphere.

Furthermore, a pressure measuring and display device 40 is connected to the conduit 30 and via a further conduit 38 is connected with a regulatable and/or adjustable valve 42 to a conduit 44 which likewise leads to the outer atmosphere.

The container 10 comprises a bottom 46 which for good thermal conduction in the example of embodiment illustrated is made from copper. By means of screws 50, 52 a plate 48 is mounted beneath the bottom 46 and clamps a spiral conduit 54 against the bottom 46. The laser gas to be purified flows through the spiral conduit 54. By means of a temperature sensor 56 the temperature in the freeze-out region at the lower side of the bottom 46 can be measured and entered into a central control to which the measuring instrument 24 and all the control means for the valves and pumps illustrated are also connected.

Laser gas flows through conduits 58, 60 into the spiral conduit 54 in the freeze-out region and out of the latter again. The conduits 58, 60 are connected to a heat exchanger 62. Preferably, the heat exchanger 62 is formed by coaxially disposed tubes.

Purified laser gas flows through a conduit 68, a valve 66 and a conduit 64 to the laser (not illustrated) whilst laser gas to be purified enters the heat exchanger 62 via a conduit 70, a gas circulation pump 72, a valve 74 and a conduit 76.

The function of the apparatus described above is as follows:

With the valve 74 open laser gas to be purified flows via the heat exchanger 62, i.e. one of the concentrically arranged tubes provided there, and via the tube 58 to the spiral conduit 54 in the freeze-out region beneath the bottom 56 of the container 10. There, the laser gas is cooled to the temperature then present at the bottom 46 and measured by the temperature sensor 56, impurities being frozen out. The freeze-out operation and in particular the nature and amount of the constituents frozen out of the laser gas are highly dependent on the temperature in the freeze-out region. The setting of this temperature will be explained in detail below.

The laser gas thus cooled and purified by freezing out (condensation) undesirable constituents flows through the other tube 60 back to the heat exchanger 62 and there cools the warm gas coming from the laser via the conduit 70 before said gas enters the conduit 54 of the freeze-out region. The purified laser gas then flows on via the conduit 68, the valve 66 and the conduit 64 to the discharge space of the laser.

The temperature at the bottom 46 of the container 10 is selectively varied according to the invention in that the pressure of the gas phase 26 above the surface 14 is set so that the temperature of the liquid nitrogen 12 assumes the desired value. This value may be above or beneath 77° K. For this purpose, by means of the vacuum pump 34 (with the valves 20, 42 closed and the valve 36 open) the free space above the surface 14 of the liquid nitrogen (which may possibly also be solid) is evacuated until the liquid nitrogen cools to the desired value, which is measured by the temperature sensor 56 and the bottom 46 and displayed at the central control. With partial vacuum operation (partial vacuum in the space above the surface 14 compared with the outer atmosphere) temperatures in the freeze-out region can be achieved which are lower than 77 K.

If however temperatures equal to or greater than 77 pk K are to be reached the valve 36 is shut off or the vacuum pump 34 put out of operation and by means of the regulatable or adjustable valve 42 an excess pressure is set in the space above the surface 14 at which the liquid nitrogen 12 assumes the desired temperature at or above 77 K. For this purpose the pressure measuring device 40 sends a pressure measurement signal to the central control which sets the valve 42 in such a manner that a desired reference pressure value is reached at which the temperature measured by the temperature sensor 56 has the desired value at which the laser gas is purified in optimum manner by freezing out.

FIG. 2 shows a modification of the example of embodiment described above of an apparatus for purifying laser gas. In the example of embodiment according to FIG. 2 liquid nitrogen emerges from the container 10 through a bottom hole 88 and a conduit 90 and enters the outer jacket of helical coaxial tubes. Said coaxial tubes form a freeze-out region 84 and the liquid nitrogen enters the arrangement of the coaxial tubes at the lower end of the freeze-out region 84 so that after heating and possibly transition to the gas phase it rises upwardly and via a rise pipe 80 there enters the upper region of the container 10, i.e. the rise pipe 80 opens into the container 10 above the surface 14 of the liquid nitrogen.

The laser gas to be purified flows from the bottom to the top in the inner tube of the freeze-out region 84 formed by the helical coaxial tubes. On arriving there, the gas flows via the tube 92 shown on the left in the figure downwardly into a precooling portion 82 which is likewise formed by helical coaxial tubes. The purified and cooled laser gas from the tube 92 flows into the outer jacket of the coaxial tubes of the precooling region 82 whilst the hot and "contaminated" laser gas entering the apparatus enters the inner tube of the precooling portion 82 in the direction of the arrow $P_1$. Thus, the incoming hot laser gas (arrow $P_1$) is precooled in the precooling portion 82 before it enters the freeze-out region 84. The purified laser gas emerges from the outer jacket of the precooling portion 82 in the direction of the arrow $P_2$ and is returned to the laser.

We claim:

1. An apparatus for purifying laser gas using liquid nitrogen to freeze impurities out of the laser gas, said apparatus comprising:
   a container for holding the liquid nitrogen; and
   means for adjusting the freeze-out temperature by means of an excess pressure valve in said container containing the liquid nitrogen such that a pressure can be set which lies above atmospheric pressure.

2. Apparatus for purifying laser gas, in particular for an $F_2$ laser, using liquid nitrogen to freeze impurities out of the laser gas, characterized in that the laser gas is purified by freezing out at a temperature of not more than 70 K.

3. Apparatus according to claim 2, characterized in that the laser gas is purified at a freeze-out temperature of not more than 66 K, preferably not more than 63 K.

4. An apparatus for the purification of laser gases having impurities, said apparatus comprising:
   an insulated vessel for holding liquid nitrogen therein;
   means to control the pressure of the nitrogen in said vessel to thereby control the boiling point of the liquid nitrogen; and
   means to flow the laser gas to be purified into a heat exchange relationship with the liquid nitrogen to freeze and to precipitate the impurities in the laser gas,
   wherein said means to control the pressure of the nitrogen in said vessel comprises means for reducing the pressure in said vessel such that the laser gas is purified by freezing out at a temperature of lower than 77 degrees Kelvin.

5. The apparatus according to claim 4 wherein said laser gas is purified by freezing out at a temperature of not more than 66 degrees Kelvin.

6. The apparatus according to claim 4 wherein said laser gas is purified by freezing out at a temperature of not more than 63 degrees Kelvin.

7. The apparatus according to claim 4 wherein said means for reducing comprises a pump.

8. An apparatus for the purification of laser gases having impurities, said apparatus comprising:
   an insulated vessel for holding liquid nitrogen therein;
   means to control the pressure of the nitrogen in said vessel to thereby control the boiling point of the liquid nitrogen; and
   means to flow the laser gas to be purified into a heat exchange relationship with the liquid nitrogen to freeze and to precipitate the impurities in the laser gas,
   wherein said means to control the pressure of the nitrogen in said vessel comprise means for reducing the pressure in said vessel such that the pressure in said vessel is less than atmospheric pressure.

* * * * *